US009749736B2

(12) United States Patent
Cagdaser et al.

(10) Patent No.: US 9,749,736 B2
(45) Date of Patent: Aug. 29, 2017

(54) SIGNAL PROCESSING FOR AN ACOUSTIC SENSOR BI-DIRECTIONAL COMMUNICATION CHANNEL

(71) Applicant: INVENSENSE, INC., San Jose, CA (US)

(72) Inventors: Baris Cagdaser, Sunnyvale, CA (US); Fariborz Assaderaghi, Emerald Hills, CA (US)

(73) Assignee: INVENSENSE, INC., San Jose, CA (US)

( * ) Notice: Subject to any disclaimer, the term of this patent is extended or adjusted under 35 U.S.C. 154(b) by 0 days.

(21) Appl. No.: 14/975,155

(22) Filed: Dec. 18, 2015

(65) Prior Publication Data

US 2016/0105750 A1  Apr. 14, 2016

Related U.S. Application Data

(63) Continuation-in-part of application No. 14/074,587, filed on Nov. 7, 2013.
(Continued)

(51) Int. Cl.
*H04R 25/00* (2006.01)
*H04R 3/00* (2006.01)
(Continued)

(52) U.S. Cl.
CPC ............ *H04R 3/00* (2013.01); *H04R 19/005* (2013.01); *G06F 13/38* (2013.01); *H04R 2201/003* (2013.01); *H04R 2420/09* (2013.01)

(58) Field of Classification Search
CPC ... G10K 2210/1282; G10K 2210/3219; H04B 15/005; H04B 2215/063; H04L 1/0057;
(Continued)

(56) References Cited

U.S. PATENT DOCUMENTS 6,853,733 B1  2/2005  Groothedde et al.
8,170,237 B2 *  5/2012  Shajaan ................. H04R 1/005
                                                          381/111
(Continued)

FOREIGN PATENT DOCUMENTS

EP  1359787 A2  11/2003
EP  1906704     4/2008
(Continued)

OTHER PUBLICATIONS

Jebreel Mohamed Muftah Salem, "A Reliable CMOS Receiver for Power Line Communications in Integrated Circuits", Dec. 11, 2012.
(Continued)

*Primary Examiner* — Lun-See Lao
(74) *Attorney, Agent, or Firm* — Amin, Turocy & Watson, LLP (57) ABSTRACT

Signal processing for an acoustic sensor bi-directional communication channel is presented herein. The acoustic sensor can comprise a micro-electro-mechanical system (MEMS) transducer configured to generate, based on an acoustic pressure, an audio output; and a bi-directional communication component configured to send and/or receive data that has been superimposed on the audio output using common mode signaling, time division multiplexing, or frequency separation. In an example, a signal processing component is configured to send the audio output directed to an external device utilizing differential mode signaling between respective pins of the acoustic sensor; and send the data utilizing the common mode signaling comprising a sum of voltages of the respective pins. In other examples, the signal processing component is configured to send and/or receive the data, and send the audio output, during different time periods; or send the data based on a frequency range outside an audio band.

20 Claims, 11 Drawing Sheets

Related U.S. Application Data (60) Provisional application No. 62/095,108, filed on Dec. 22, 2014.

(51) Int. Cl.
*H04R 19/00* (2006.01)
*G06F 13/38* (2006.01)

(58) Field of Classification Search
CPC ... H04L 1/0058; H04L 1/0066; H04L 1/0071; H04R 19/01; H04R 19/016; H04R 3/005; H04R 19/005; H04R 19/04; H04R 2201/003; H04R 2225/021; H04R 2225/67; H04R 23/008; H04R 2420/05; H04R 25/606; H04R 3/00
USPC ............ 381/111, 112, 113, 92, 174
See application file for complete search history.

(56) References Cited

U.S. PATENT DOCUMENTS

| | | | |
|---|---|---|---|
| 8,290,186 B2 | 10/2012 | Jung | |
| 8,478,912 B2* | 7/2013 | Liu | G06F 1/1613 710/316 |
| 8,831,246 B2 | 9/2014 | Josefsson | |
| 9,084,070 B2 | 7/2015 | Crockett et al. | |
| 9,161,112 B2 | 10/2015 | Ye | |
| 2004/0122541 A1 | 6/2004 | DiSanza et al. | |
| 2004/0156520 A1 | 8/2004 | Poulsen et al. | |
| 2005/0169483 A1 | 8/2005 | Malvar et al. | |
| 2008/0153537 A1 | 6/2008 | Khawand et al. | |
| 2008/0167868 A1 | 7/2008 | Kanevsky et al. | |
| 2010/0113088 A1 | 5/2010 | Erceg et al. | |
| 2010/0254544 A1* | 10/2010 | Kimura | H04B 15/005 381/94.1 |
| 2011/0142261 A1 | 6/2011 | Josefsson | |
| 2011/0200215 A1 | 8/2011 | Apfel et al. | |
| 2012/0114134 A1* | 5/2012 | Li | H04B 5/06 381/77 |
| 2012/0300960 A1* | 11/2012 | Mackay | H04H 60/04 381/119 |
| 2013/0058495 A1 | 3/2013 | Furst et al. | |
| 2013/0108088 A1 | 5/2013 | Jensen et al. | |
| 2013/0163781 A1* | 6/2013 | Thyssen | H04R 3/007 381/94.3 |
| 2013/0182876 A1 | 7/2013 | Mulder et al. | |
| 2013/0195288 A1 | 8/2013 | Ye | |
| 2014/0321664 A1 | 10/2014 | Huang et al. | |
| 2014/0348331 A1 | 11/2014 | Gran et al. | |
| 2015/0124984 A1 | 5/2015 | Han et al. | |
| 2016/0125876 A1 | 5/2016 | Schroeter et al. | |

FOREIGN PATENT DOCUMENTS

| | | |
|---|---|---|
| JP | 2013-521687 | 6/2013 |
| WO | 2007009465 | 1/2007 |

OTHER PUBLICATIONS

Vipul Chawla, et al., "Dual Use of Power Lines for Data Communications in Microprocessors," 2011, IEEE.
Office Action dated Dec. 31, 2015 for U.S. Appl. No. 14/074,587, 38 pages.
Extended European Search Report dated Mar. 31, 2015 for European Application Serial No. EP20140191773, 8 pages.
Korean Office Action dated Jun. 16, 2016 for Korean Application Serial No. 10-2014-0153844, 3 pages.
Korean Office Action dated Nov. 2, 2015 for Korean Application Serial No. 10-2014-0153844, 4 pages.
International Search Report and Written Opinion dated Mar. 15, 2016 for PCT Application Serial No. PCT/US2015/067413, 13 pages.
European Office Action dated Feb. 4, 2016 for European Application Serial No. 14 191 773.2, 6 pages.
Office Action dated Jun. 27, 2016 for U.S. Appl. No. 14/074,587, 38 pages.
International Search Report and Written Opinion for PCT Application Serial No. PCT/US2016/047346 dated Nov. 14, 2016, 11 pages.
Korean Office Action dated Sep. 27, 2016 for Korean Application Serial No. 10-2014-0153844, 5 pages (including English translation).
Office Action dated May 3, 2017 for U.S. Appl. No. 14/951,749, 39 pages.

* cited by examiner

FIG. 11

SIGNAL PROCESSING FOR AN ACOUSTIC SENSOR BI-DIRECTIONAL COMMUNICATION CHANNEL

PRIORITY CLAIM

This patent application is a continuation-in-part of, and claims priority to, U.S. patent application Ser. No. 14/074,587, filed Nov. 7, 2013, and entitled "MULTI-FUNCTION PINS FOR A PROGRAMMABLE ACOUSTIC SENSOR." Further, this application claims priority to U.S. Provisional Patent Application No. 62/095,108, filed Dec. 22, 2014, and entitled "SIGNAL PROCESSING FOR ACOUSTIC SENSOR BI-DIRECTIONAL COMMUNICATION CHANNELS". The entireties of the aforementioned applications are incorporated by reference herein.

TECHNICAL FIELD

The subject disclosure generally relates to acoustic sensors, but not limited to, signal processing for an acoustic sensor bi-directional communication channel.

BACKGROUND

Multiple acoustic sensors, i.e., micro-electro-mechanical system (MEMS) microphones, are used in consumer electronic devices. Placement of such devices on circuit boards is driven by acoustic properties, and can constrain electrical connectivity, i.e., the number of pins used in a sensor device. In this regard, although conventional acoustic sensor technologies utilize standard bi-directional communication interfaces, i.e., Inter-Integrated Circuit ($I^2C$), Serial Peripheral Interface (SPI), or SoundWire, to communicate information in addition to audio output, such interfaces require 2 to 4 additional, dedicated pins per device. Consequently, conventional acoustic sensor technologies have had some drawbacks, some of which may be noted with reference to the various embodiments described below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional acoustic sensor technologies have had some drawbacks with respect to using dedicated pins on a sensor device to communicate, e.g., non-audio, information. Various embodiments disclosed herein can improve use of valuable circuit board real estate by sending/receiving data that has been superimposed on audio output signaling using signal processing techniques.

For example, an acoustic sensor can comprise a MEMS transducer, e.g., MEMS microphone, and a bi-directional communication component. The MEMS transducer can be configured to generate, based on an acoustic pressure, an audio output. The bi-directional communication component can be configured to send and/or receive data that has been superimposed on the audio output using common mode signaling, time division multiplexing, or frequency separation.

In an embodiment, the MEMS transducer can comprise a signal processing component that can be configured to send the audio output directed to an external device, e.g., a coder-decoder (codec), a digital signal processor (DSP), etc. utilizing differential mode signaling between a first pin of the acoustic sensor and a second pin of the acoustic sensor. Further, the signal processing component can be configured to send the data utilizing common mode signaling according to a sum of respective voltages of the first pin and second pin.

In one embodiment, the signal processing component can be configured, based on the time division multiplexing, to send the audio output directed to the external device during a first defined period of time, and send or receive the data during a second defined period of time, e.g., during which loss of audio information can be substantially compensated for, minimized, etc.

In another embodiment, the signal processing component can be configured, based on the time division multiplexing, to send the audio output directed to the external device utilizing a pin of the acoustic sensor. Further, the signal processing component can be configured to send and/or receive the data utilizing the pin.

In yet another embodiment, the signal processing component can be configured, based on the time division multiplexing, to send the audio output directed to the external device utilizing a first pin of the acoustic sensor, and send or receive the data utilizing a second pin of the acoustic sensor.

In an embodiment, the signal processing component can be configured, based on the frequency separation, to send or receive the data based on a defined frequency range that is outside an audio band corresponding to the audio output, and/or substantially outside the audio band.

In one embodiment, the defined frequency range corresponds to a notch of a decimation filter of an external device coupled to the acoustic sensor, a defined stopband of a band-stop filter of the external device, etc.

In another embodiment, the signal processing component can be configured, based on the frequency separation, to send the audio output directed to the external device utilizing a pin of the acoustic sensor, and send or receive the data utilizing the pin.

In yet another embodiment, the signal processing component can be configured, based on the frequency separation, to send the audio output directed to the external device utilizing a first pin of the acoustic sensor, and send or receive the data utilizing a second pin.

In an embodiment, the acoustic sensor can comprise a power line communication component configured to send and/or receive communication data utilizing a power pin and/or a ground pin of the acoustic sensor.

In one embodiment, a method can comprise generating, by an acoustic sensor, an audio output corresponding to an acoustic pressure applied to a MEMS transducer; and sending and/or receiving, by the acoustic sensor, data that has been superimposed on the audio output based on common mode signaling, time division multiplexing, or frequency separation.

In another embodiment, the method can comprise sending, by the acoustic sensor, the audio output directed to an external device using differential signaling between a first pin of the system and a second pin of the system, and sending, based on the common mode signaling, the data based on a sum of respective voltages of the first pin and the second pin.

In yet another embodiment, the sending and/or receiving the data based on the time division multiplexing can comprise sending the audio output directed to an external device during a first time period, and sending or receiving the data during a second time period.

In an embodiment, the sending the audio output comprises sending the audio output directed to the external device during the first time period using a pin of the acoustic sensor. Further, the sending or receiving the data during the second time period comprises sending or receiving the data during the second time period using the pin.

In one embodiment, the sending or receiving the data based on the frequency separation comprises sending or receiving the data based on a defined frequency range that is outside an audio band corresponding to the audio output, or substantially outside the audio band.

In another embodiment, the sending or receiving the data based on the defined frequency range comprises sending or receiving the data based on a defined stopband of a band-stop filter of an external device coupled to the acoustic sensor, a notch of a decimation filter of the external device, etc.

In yet another embodiment, the sending or receiving the data based on the defined frequency range can comprise sending the audio output directed to the external device using a pin of the acoustic sensor, and sending or receiving the data using the pin.

In an embodiment, the method can further comprise sending and/or receiving, by the acoustic sensor, communication data, e.g., associated with the data, bi-directional communication component 130, etc. using a power pin of the acoustic sensor and/or a ground pin of the acoustic sensor.

In one embodiment, a system can comprise an acoustic transducer configured to convert an acoustic signal into an audio output; and a bi-directional communication component configured to send and/or receive data that has been superimposed on the audio output based on a common mode transmission, a time division multiplexing transmission, or frequency separation.

In another embodiment, the system can comprise a signal processing component configured to send, via a pin of the system, the audio output directed to an external device, and based on at least one of the time division multiplexing transmission or the frequency separation, send and/or receive the data via the pin.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Aspects of apparatus, devices, systems, processes, and process blocks explained herein can constitute machine-executable instructions embodied within a machine, e.g., embodied in a memory device, computer readable medium (or media) associated with the machine. Such instructions, when executed by the machine, can cause the machine to perform the operations described. Additionally, aspects of the apparatus, devices, systems, processes, and process blocks can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Conventional acoustic sensor technologies have had some drawbacks with respect to using dedicated pins to communicate, e.g., non-audio, information. On the other hand, various embodiments disclosed herein can preserve valuable circuit board real estate and substantially reduce interference between communication signaling and audio output signaling by superimposing, via common pin(s), the communication signaling on the audio output signaling utilizing various signal processing techniques.

Figure 1:
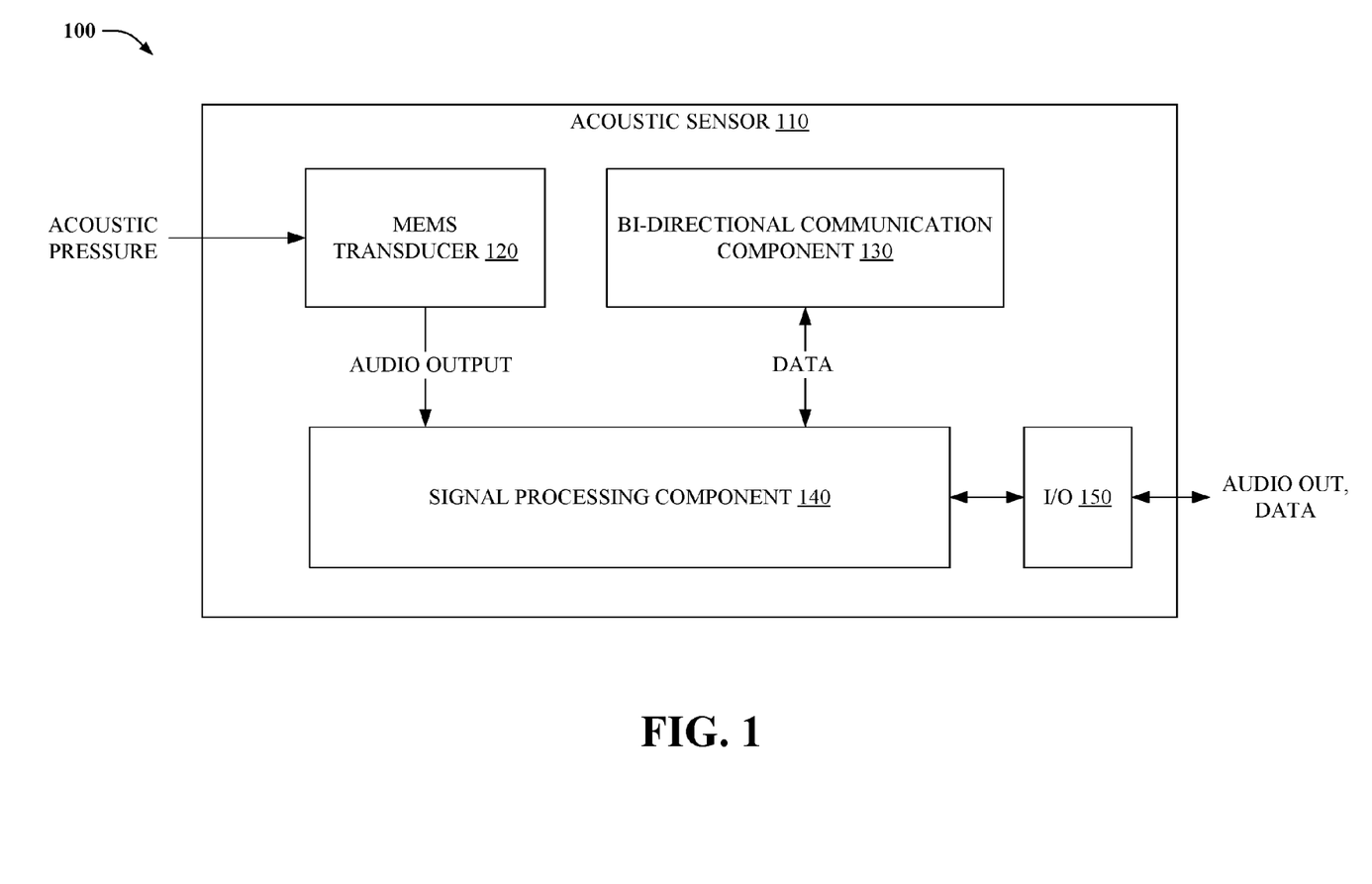
FIG. 1 illustrates a block diagram of an acoustic sensor comprising a bi-directional communication component configured to send and/or receive data that has been superimposed on an audio output, in accordance with various embodiments.

In this regard, and now referring to FIG. 1, acoustic sensor 110 comprises MEMS transducer 120, bi-directional communication component 130, signal processing component 140, and input/output (I/O) 150. MEMS transducer 120 can be in contact with an acoustic pressure, and variations in the acoustic pressure can cause change(s) in electrical parameter(s) of MEMS transducer 120. In an embodiment, MEMS transducer 120 can be formed from, e.g., a diaphragm, a suspended plate, etc. In this regard, an increase or decrease of the acoustic pressure can bend the diaphragm, or cause a translational displacement of the suspended plate, and MEMS transducer 120 can represent corresponding change(s) in the electrical parameter(s) via an audio output signal. In embodiments, the electrical parameter(s) can comprise a capacitance change representing a bending of the diaphragm or displacement of the suspended plate.

Signal processing component 140 can generate, based on the audio output signal generated by MEMS transducer 120, an electrical output signal, audio data, audio out, etc. representing the acoustic pressure. Further, signal processing component 140 can send the audio data to various components of acoustic sensor 110, e.g., amplifier(s), a non-volatile memory, a digital interface (DIF), etc. (not shown) (see e.g. related text of parent U.S. patent application Ser. No. 14/074,587 incorporated by reference herein), and exchange the audio data with a device that is external to acoustic sensor 110, e.g., a host, a DSP, processor, etc. (not shown) utilizing electrical interface pins (e.g., 250, 260, 420, 610) (see below) of I/O 150.

Bi-directional communication component 130 can comprise the DIF, which can be used to send/receive data, communication data, etc. to/from registers, non-volatile memory, etc. (not shown) of acoustic sensor 110, e.g., for testing, configuring, trimming, obtaining information from, etc. various components of acoustic sensor 110. Further, signal processing component 140 can send/receive the communication data (e.g. DATA, DATA OUT, etc.) between acoustic sensor 110 and an external device (not shown) using common electrical interface pins(s) of I/O 150. In this regard, signal processing component 140 can superimpose, e.g., using logic, switches, multiplexers, demultiplexers, etc. (not shown) the communication data on the audio data using common mode signaling, time division multiplexing, or frequency separation.

Figure 2:
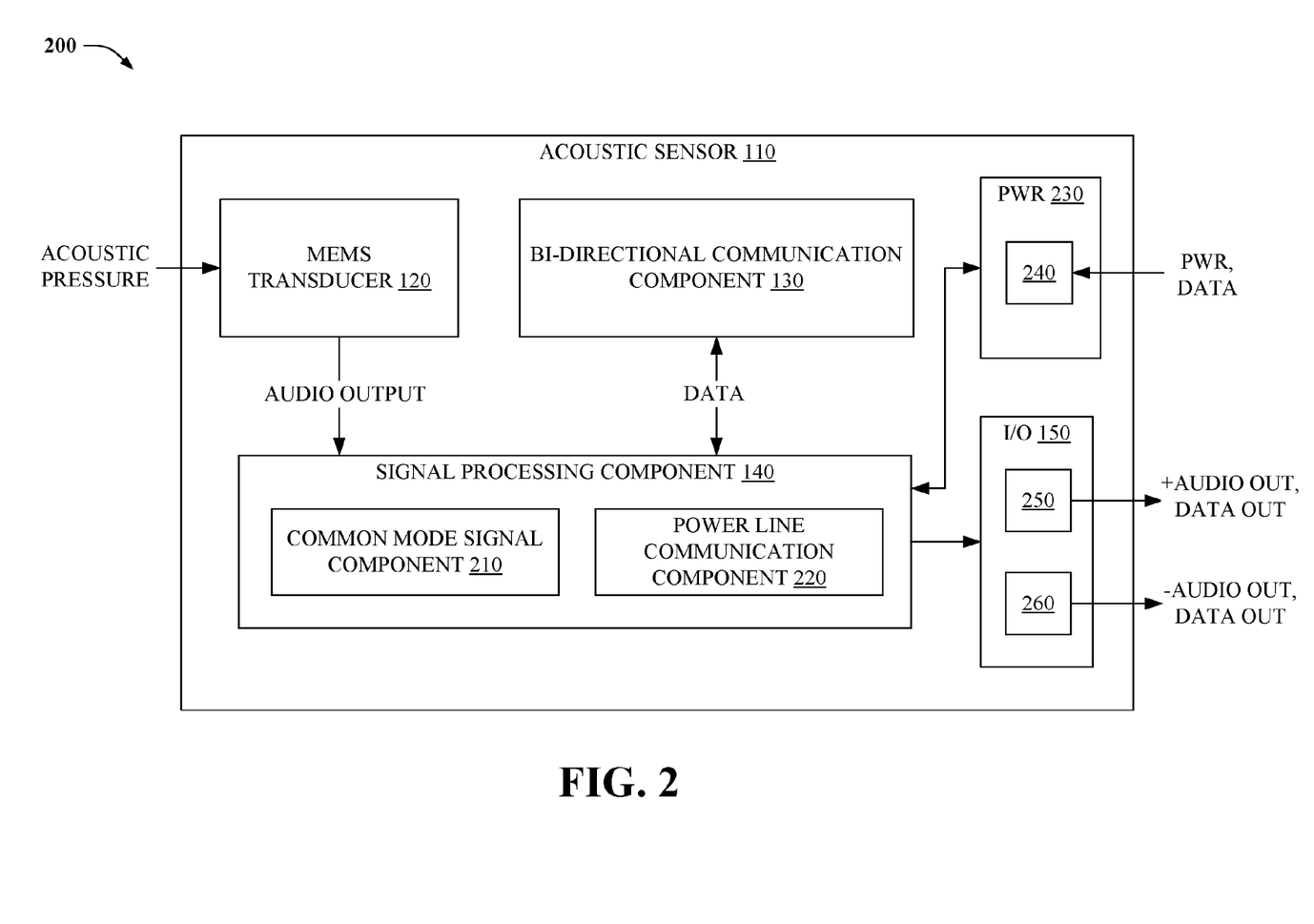
FIG. 2 illustrates a block diagram of an acoustic sensor comprising a common mode signal component for sending data that has been superimposed on an audio output, in accordance with various embodiments.
Figure 3:
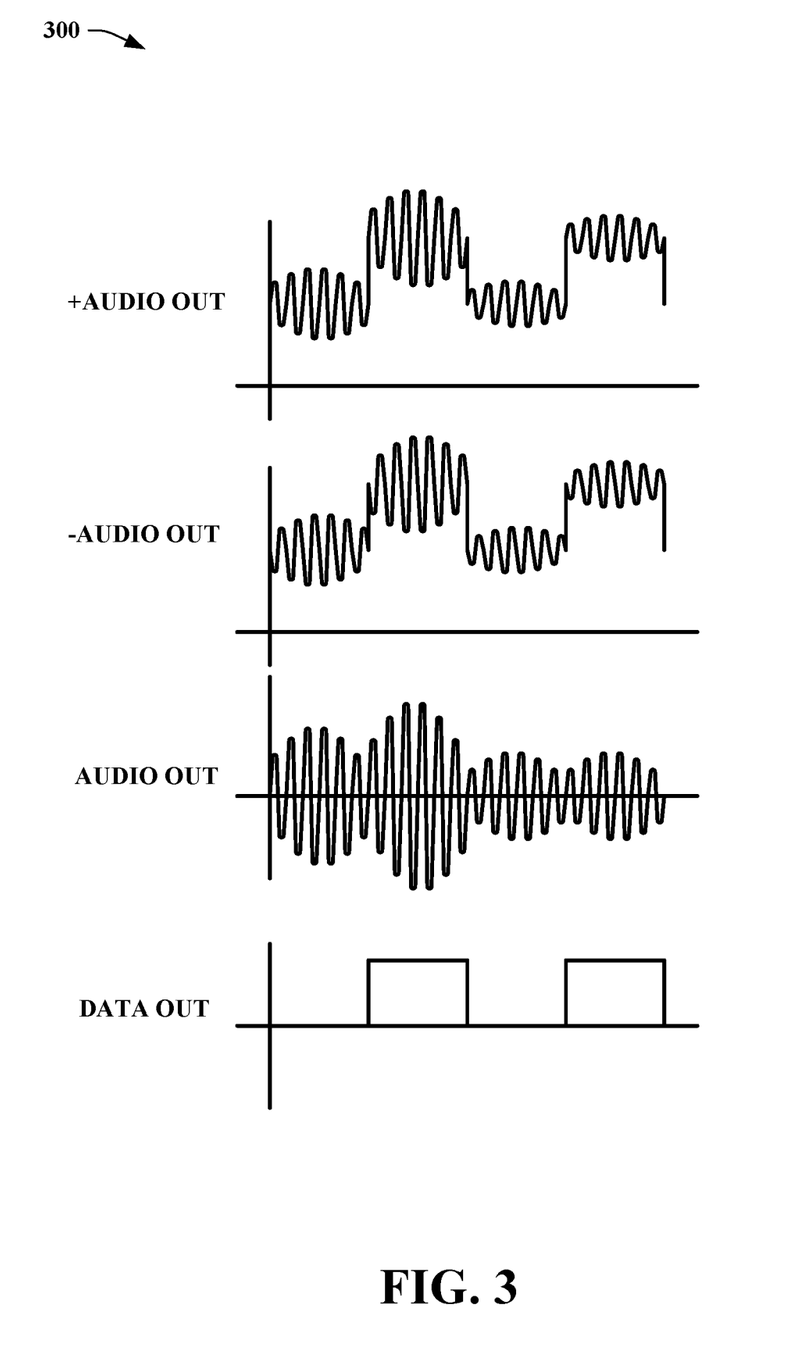
FIG. 3 illustrates waveforms representing differential mode audio output signaling of respective pins and common mode data signaling on the respective pins, in accordance with various embodiments.

Referring now to FIGS. 2 and 3, a block diagram (200) of an acoustic sensor comprising a common mode signal component (210) for sending data, communication data, etc. that has been superimposed on an audio output, and waveforms representing associated differential and common mode signaling are illustrated, respectively, in accordance with various embodiments. In this regard, signal processing component 140 can send, based on an audio output received from MEMS transducer 120, the audio output as a differential output signal, e.g., "+AUDIO OUT" and "−AUDIO OUT", using electrical interface pins 250 and 260. Further, common mode signal component 210 can send the communication data, e.g., "DATA OUT", to an external device (not shown) utilizing common mode signaling comprising a sum of respective voltages of electrical interface pins 250 and 260. As illustrated by FIG. 3, the audio output, e.g., "AUDIO OUT", comprises a voltage difference between differential output signals "+AUDIO OUT" and "−AUDIO OUT". Further, the communication data, e.g., "DATA OUT", comprises the sum of the "+AUDIO OUT" and "−AUDIO OUT" waveforms.

In other embodiments (not shown), signal processing component can receive the communication data, e.g., "DATA", "DATA IN", etc. from the external device utilizing the common mode signaling. In this regard, electrical interface pins 250 and 260 can comprise bi-directional input/output pins, and acoustic sensor can comprise receiver(s), amplifier(s), comparator(s), analog-to-digital converter(s), etc. (not shown) to decode, convert, etc. the common mode data into a standard logic level signal that can be input to bi-directional communication component 130.

In an embodiment, power line communication component 220 can be configured to receive, via power pin 240, e.g., a power pin or a ground pin of power supply interface (PWR) 230, communication data from the external device. In this regard, power line communication component 220 can include a data and clock conditioning circuit (not shown) (see e.g. related text of parent U.S. patent application Ser. No. 14/074,587 incorporated by reference herein), that can translate communication data encoded onto power pin 240 into a standard logic level signal that can be input to bi-directional communication component 130.

In one embodiment, the data and clock conditioning circuit can utilize a high frequency carrier and amplitude shift key signaling scheme superimposed on power. (See e.g. FIG. 3 and related text of parent U.S. patent application Ser. No. 14/074,587 incorporated by reference herein). In another embodiment, the data and clock conditioning circuit can utilize a pass-band signaling scheme superimposed on power. (See e.g. FIG. 4 and related text of parent U.S. patent application Ser. No. 14/074,587 incorporated by reference herein). In yet another embodiment, the data and clock conditioning circuit can utilize a baseband signaling scheme superimposed on power. (See e.g. FIG. 5 and related text of parent U.S. patent application Ser. No. 14/074,587 incorporated by reference herein).

Figure 4:
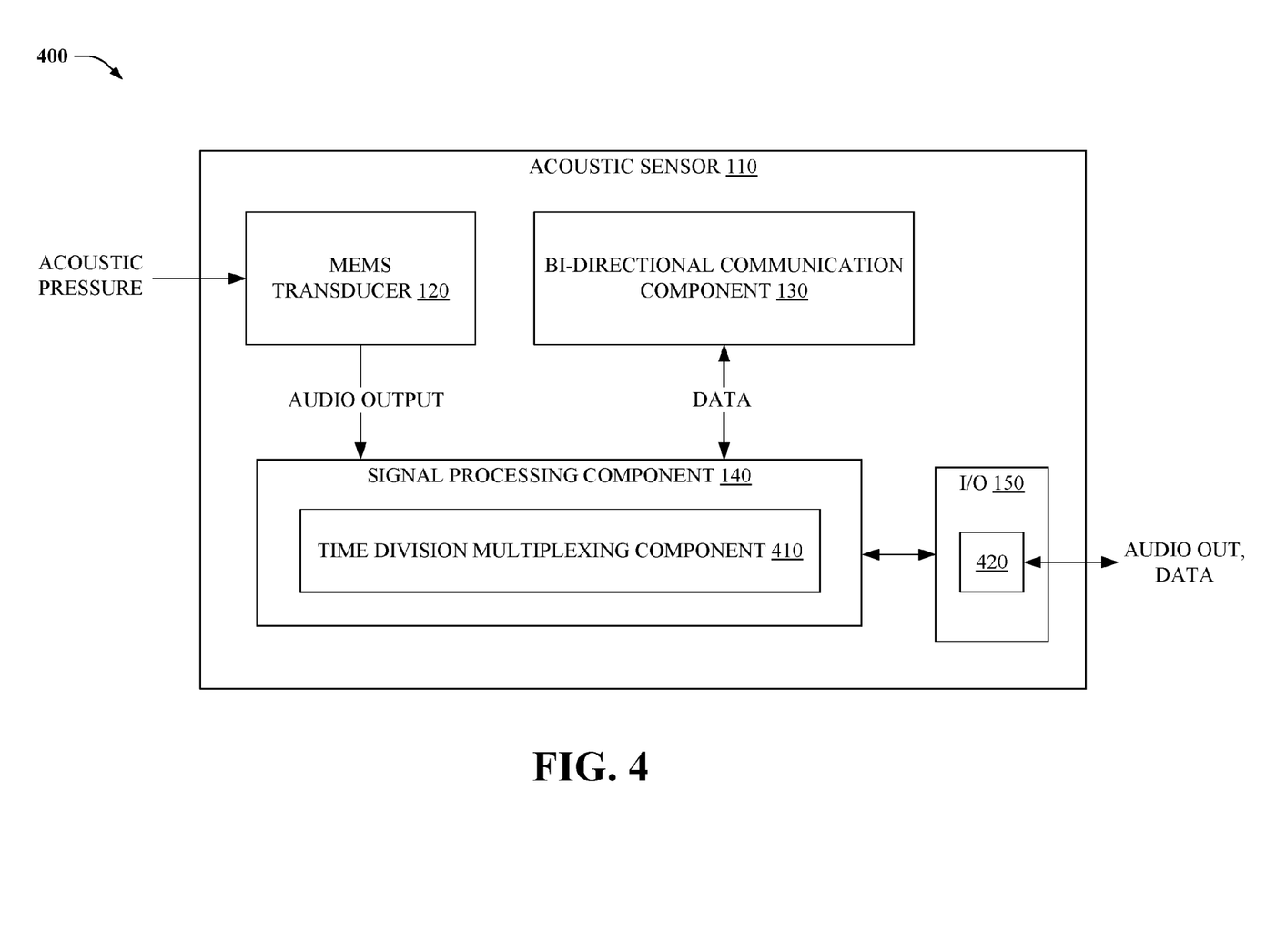
FIG. 4 illustrates a block diagram of an acoustic sensor comprising a time division multiplexing component for sending and/or receiving data that has been superimposed on an audio output, in accordance with various embodiments.
Figure 5:
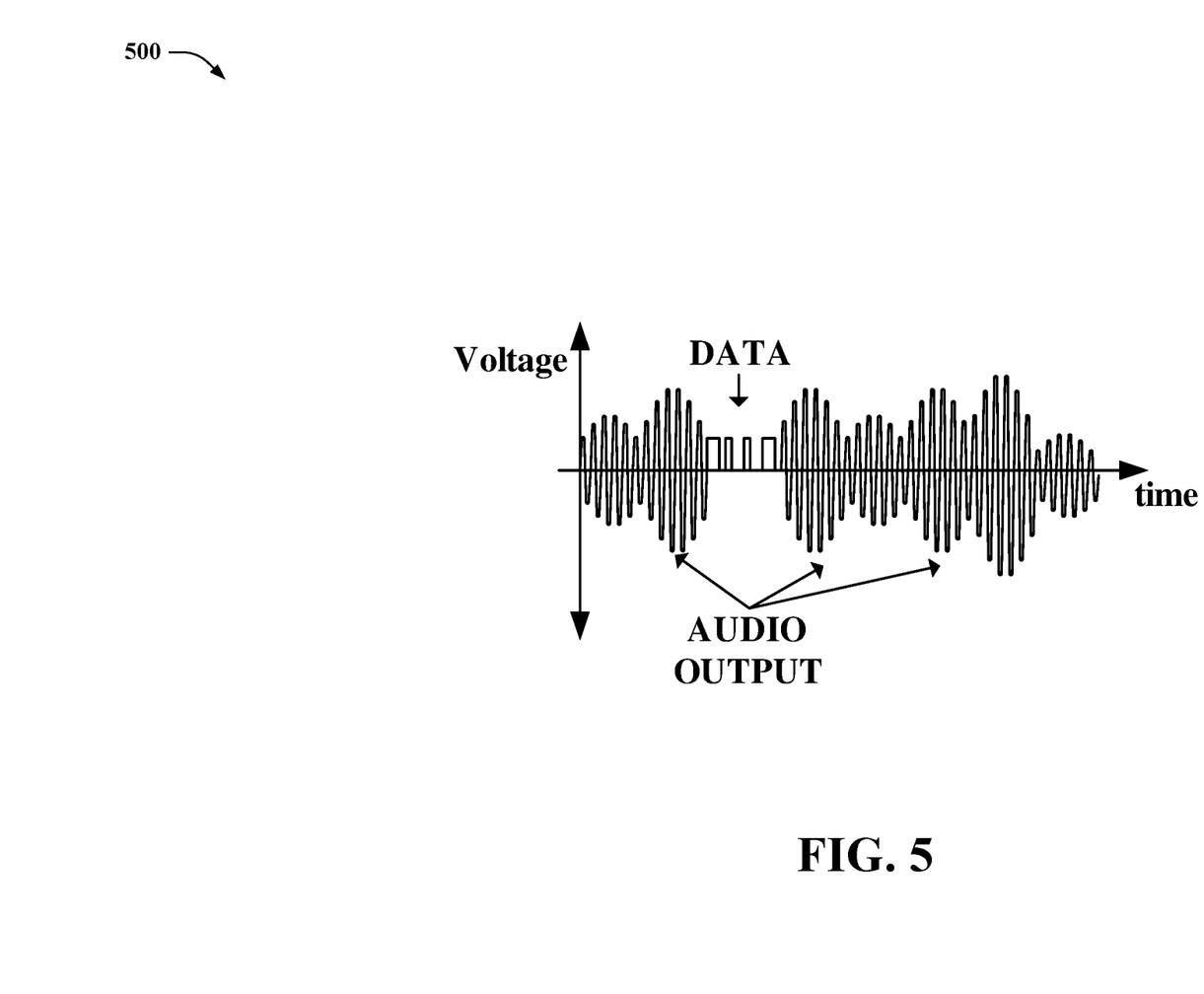
FIG. 5 illustrates a waveform representing data that has been superimposed on an audio output utilizing time division multiplexing, in accordance with various embodiments.

FIG. 4 illustrates a block diagram (400) of an acoustic sensor comprising a time division multiplexing component (410) for sending and/or receiving data that has been superimposed on an audio output, in accordance with various embodiments. In this regard, and now referring to FIG. 5, time division multiplexing component 410 can be configured to send the audio output, e.g., "AUDIO OUTPUT", directed to an external device (not shown) during a first defined period of time. Further, time division multiplexing component 410 can be configured to send or receive the communication data, e.g., "DATA", "DATA IN", "DATA OUT", etc. during a second defined period of time utilizing bi-directional electrical interface pin 420, e.g., reducing or substantially reducing interference between the communication data and the audio output data, e.g., due to supply, ground, etc. layout imperfections, package limitations, etc.

In one embodiment, time division multiplexing component 410 can be configured to send the audio output directed to the external device utilizing a pin, e.g., electrical interface pin 410, and send or receive the communication data utilizing the same pin.

Figure 6:
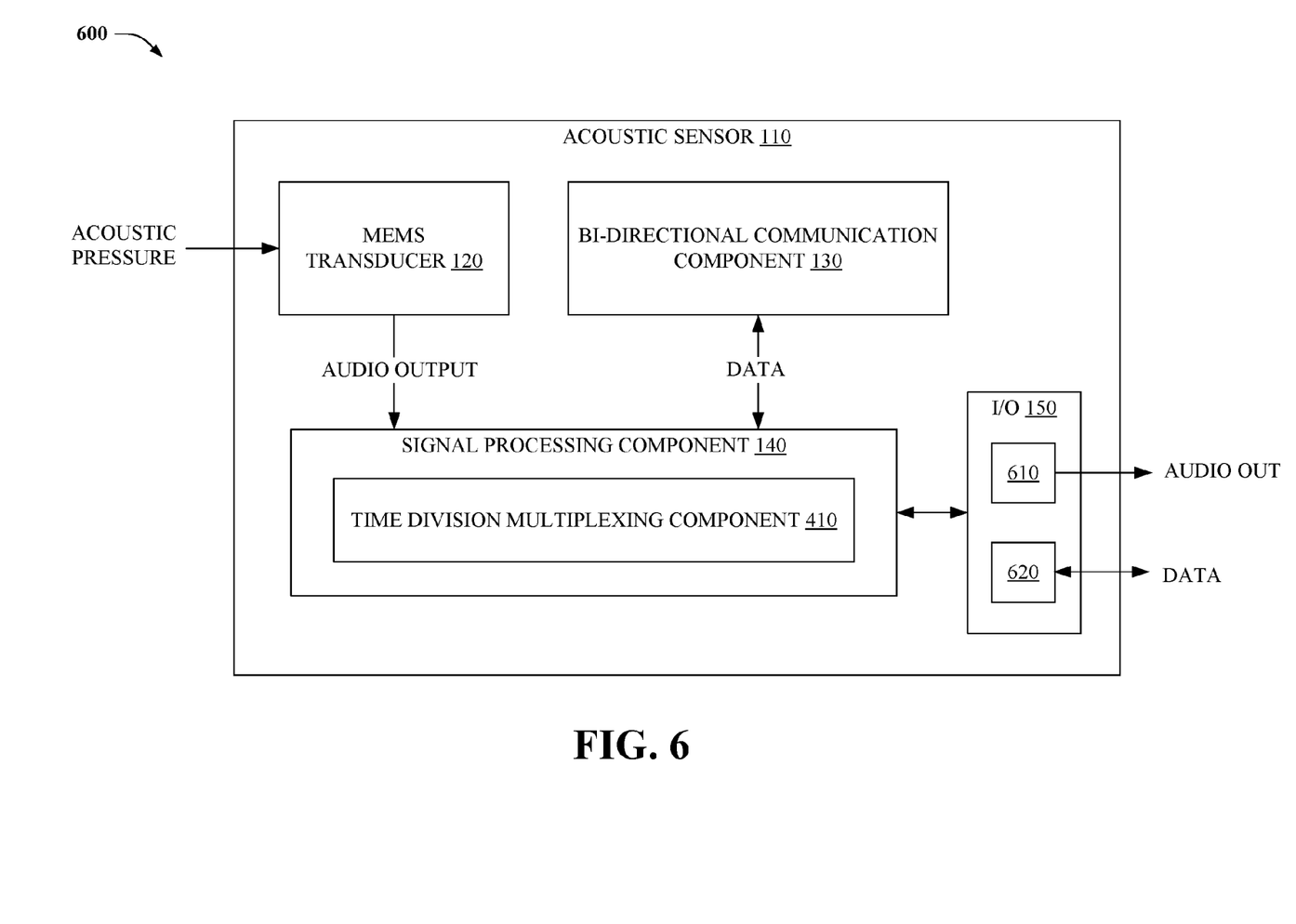
FIG. 6 illustrates a block diagram of an acoustic sensor comprising a signal processing component for sending an audio output using a pin, and based on time division multiplexing, sending and/or receiving data using another pin.

In another embodiment illustrated by FIG. 6, time division multiplexing component 410 can be configured to send the audio output directed to the external device utilizing a first pin, e.g., electrical interface pin 610, and send or receive the data utilizing a different, or second, pin, e.g., bi-directional electrical interface pin 620.

Figure 7:
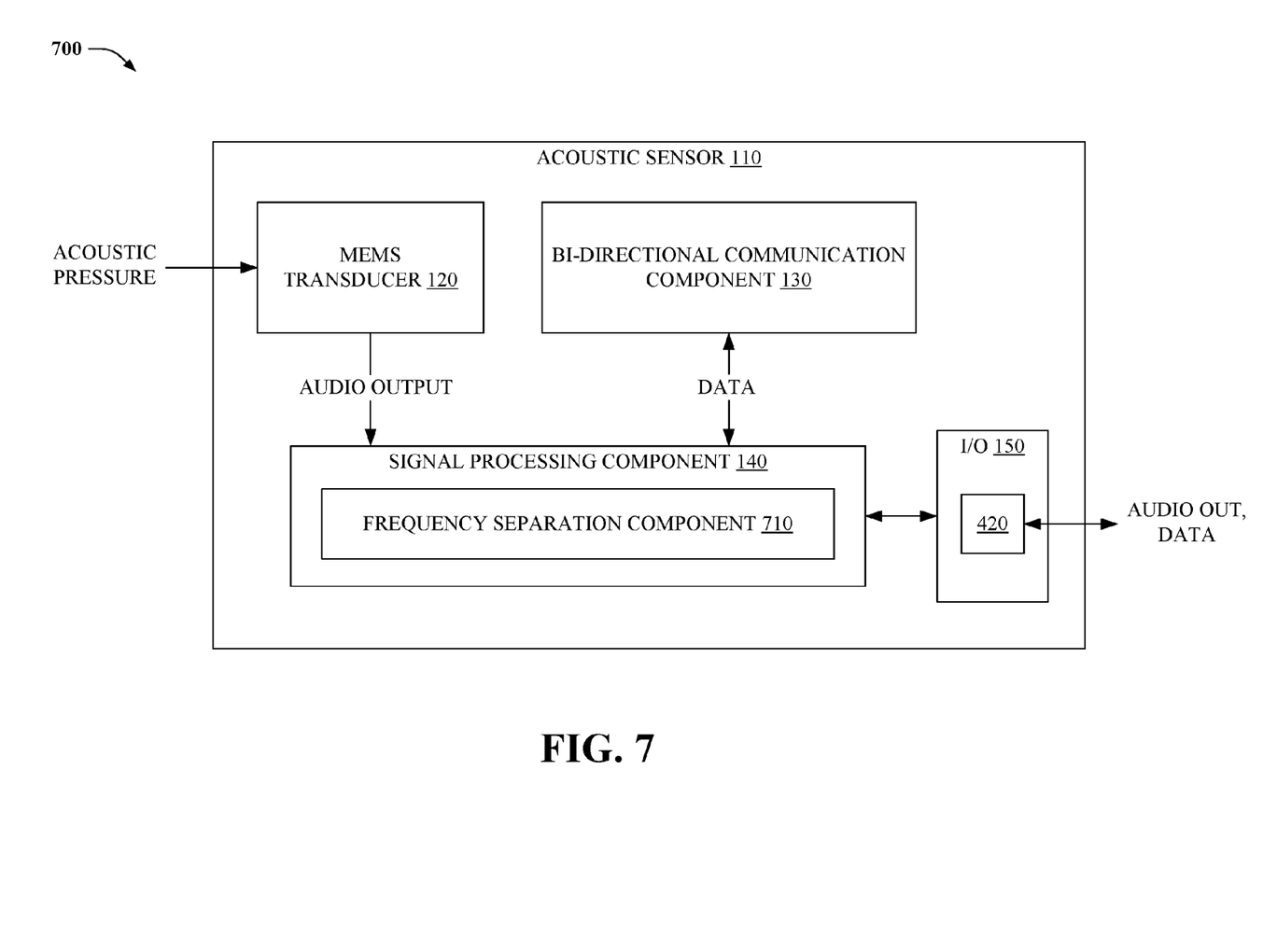
FIG. 7 illustrates a block diagram of an acoustic sensor comprising a frequency separation component for sending and/or receiving data based on a defined frequency range that is outside/substantially outside an audio band corresponding to an audio output.
Figure 8:
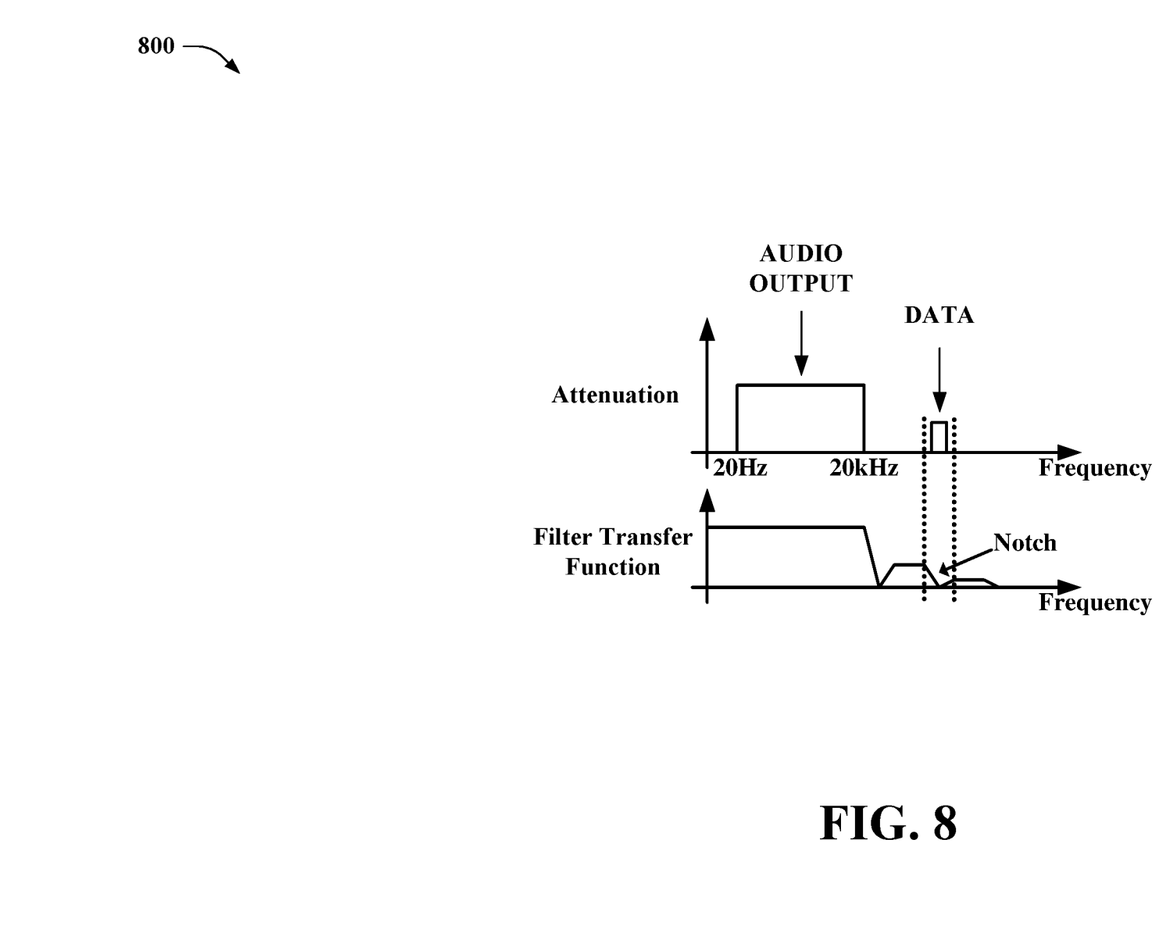
FIG. 8 illustrates waveforms representing a frequency spectrum of data that has been superimposed on an audio output based on a decimation filter employed in a host system, and a transfer function of the decimation filter, respectively, in accordance with various embodiments.

Now referring to FIG. 7, a block diagram (700) of an acoustic sensor comprising a frequency separation component (710) for sending and/or receiving data based on a defined frequency range that is outside, or substantially outside, an audio band, e.g., 20 Hz to 20 kHz, corresponding to an audio output is illustrated, in accordance with various embodiments. In this regard, frequency separation component 710 can be configured to send or receive the data, e.g., pulse-density modulation (PDM) audio data, based on a defined frequency range that is outside an audio band corresponding to the audio output, or substantially outside the audio band. In an embodiment illustrated by FIG. 8, the defined frequency range can correspond to a notch of a decimation filter of an external device (not shown) coupled to the acoustic sensor, a defined stopband of a band-stop filter of the external device, etc.

In one embodiment, frequency separation component 710 can receive, from the external device via the communication data, e.g., in the form of a clock signal, frequency information representing the notch, the defined stopband, etc. Further, frequency separation component 710 can send or receive the data based on the frequency information.

Figure 9:
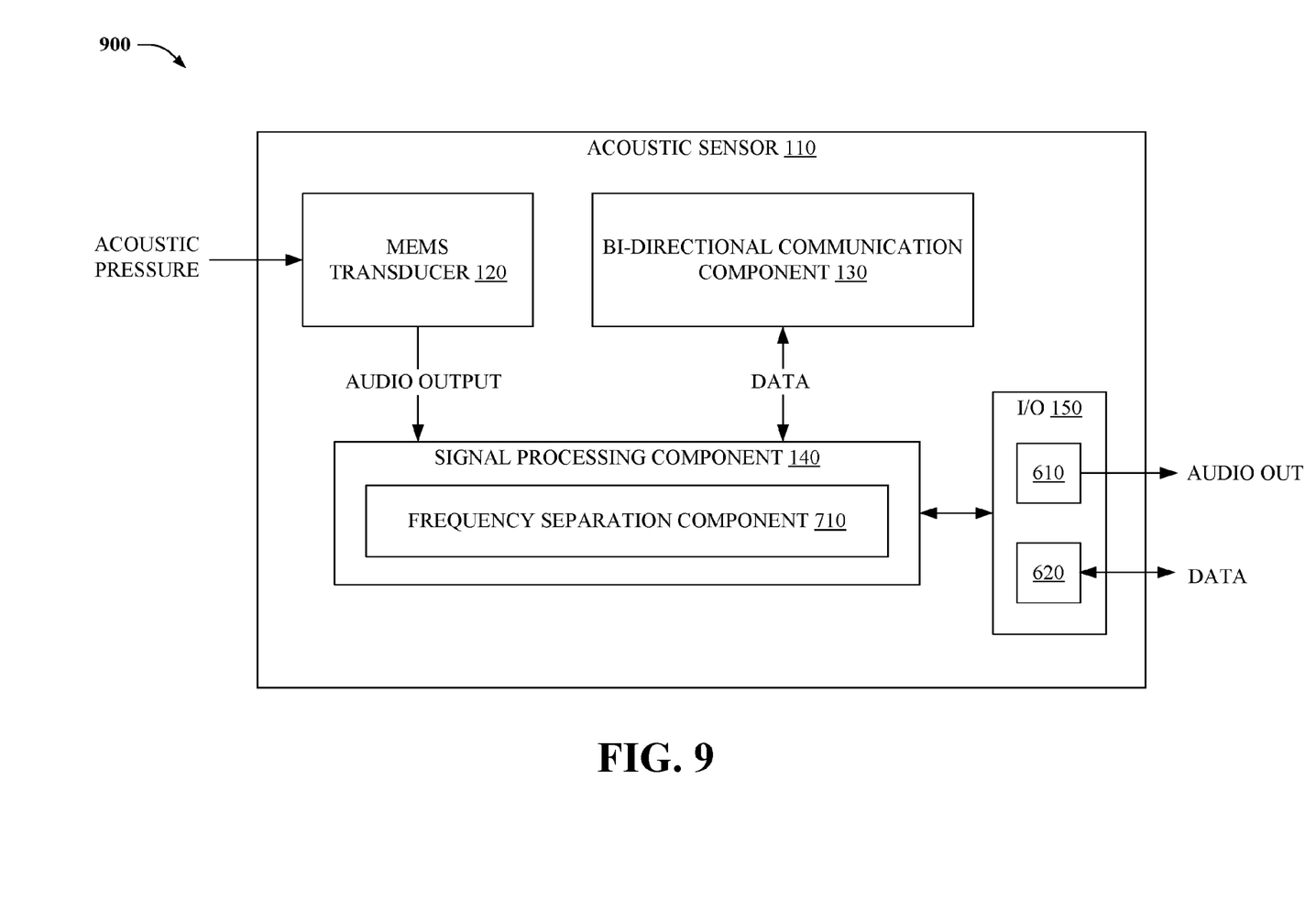
FIG. 9 illustrates a block diagram of an acoustic sensor comprising a frequency separation component for sending and/or receiving, via a first pin, data based on a defined frequency range that is outside/substantially outside of an audio band corresponding to an audio output of a second pin.

As illustrated by FIG. 7, signal processing component 140 can be configured to send the audio output directed to the external device utilizing bi-directional electrical interface pin 420, and send or receive the communication data—according to the defined frequency range—utilizing the same pin. In another embodiment illustrated by FIG. 9, signal processing component 140 can be configured to send the audio output directed to the external device utilizing a first pin, e.g., electrical interface pin 610, and send or receive the communication data—according to the defined frequency range—utilizing a second pin, e.g., bi-directional electrical interface pin 620.

Figure 10:
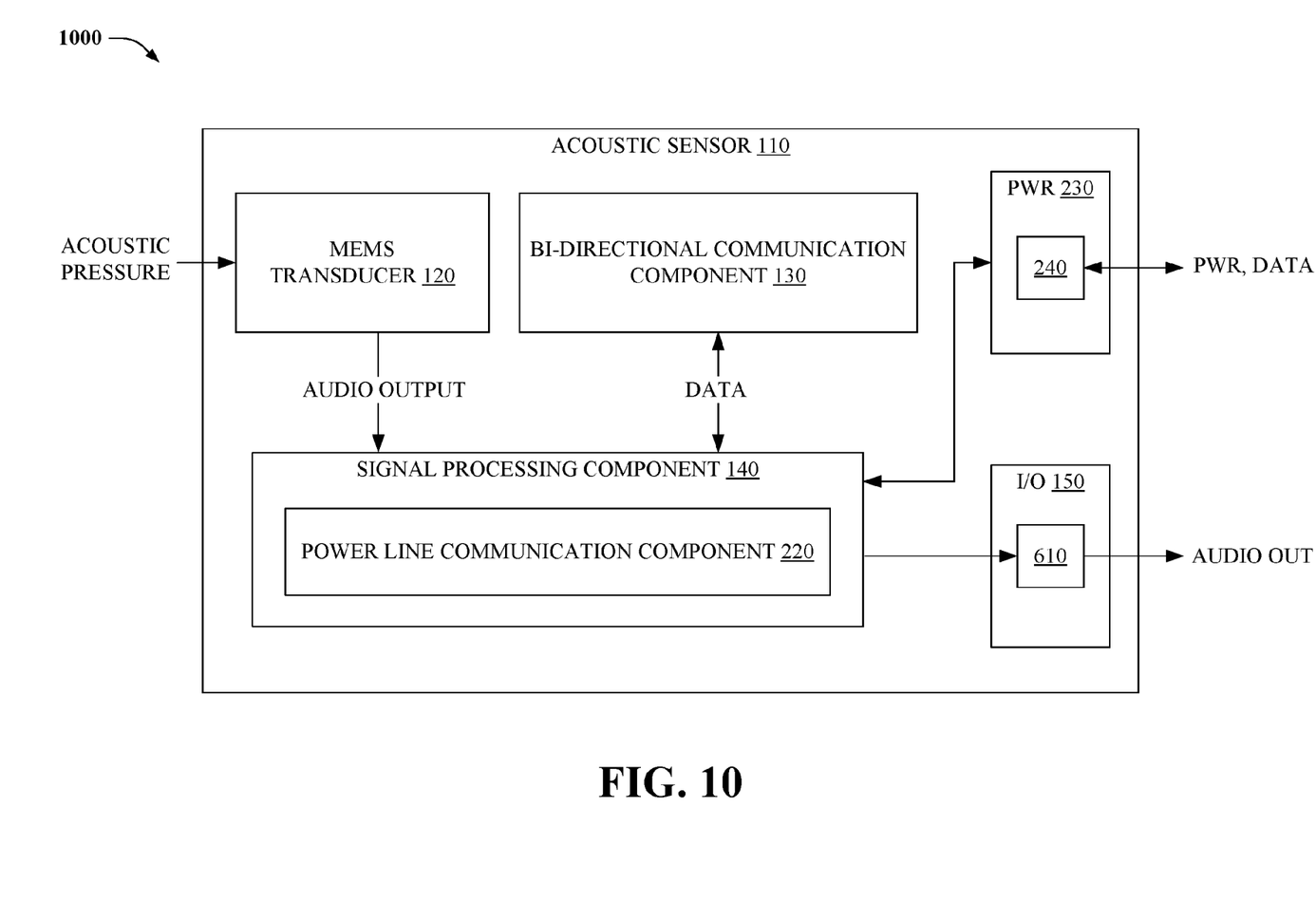
FIG. 10 illustrates a block diagram of an acoustic sensor comprising a power line communication component for sending/receiving data via a power and/or ground pin, in accordance with various embodiments.

FIG. 10 illustrates a block diagram (1000) of an acoustic sensor comprising a power line communication component (220) for sending and/or receiving data via a power pin (240), in accordance with various embodiments. In this regard, as described above, power line communication component 220 can include a data and clock conditioning circuit to translate communication data encoded onto power pin 240 into a standard logic level signal that can be input to bi-directional communication component 130.

In the case of sending, outputting, etc. data via power pin 240, power line communication component 220 can transmit communication data, data, etc., e.g., received from bi-directional communication component 130, in the form of a load current through power pin 240—the data output converted into current pulses. In one embodiment, a data input and/or data clock can be received, via power pin 240, as superimposed voltage signals. (See e.g. related text and Figures of parent U.S. patent application Ser. No. 14/074,587 incorporated by reference herein).

In embodiment(s), MEMS transducer 120 and other components of acoustic sensor 110 can be fully integrated in a single die, implemented on separate dies in which MEMS transducer 120 and the other components are interconnected via additional pins and bond wires, etc. Further, acoustic sensor 110 can be coupled to a host system (not shown), e.g., a codec, a DSP, a processor, etc. via I/O 150. For example, the host system can be a tester used during production and characterization of acoustic sensor 110, an external device that acquires/sends an acoustic sensor output, communication data, etc.

Figure 11:
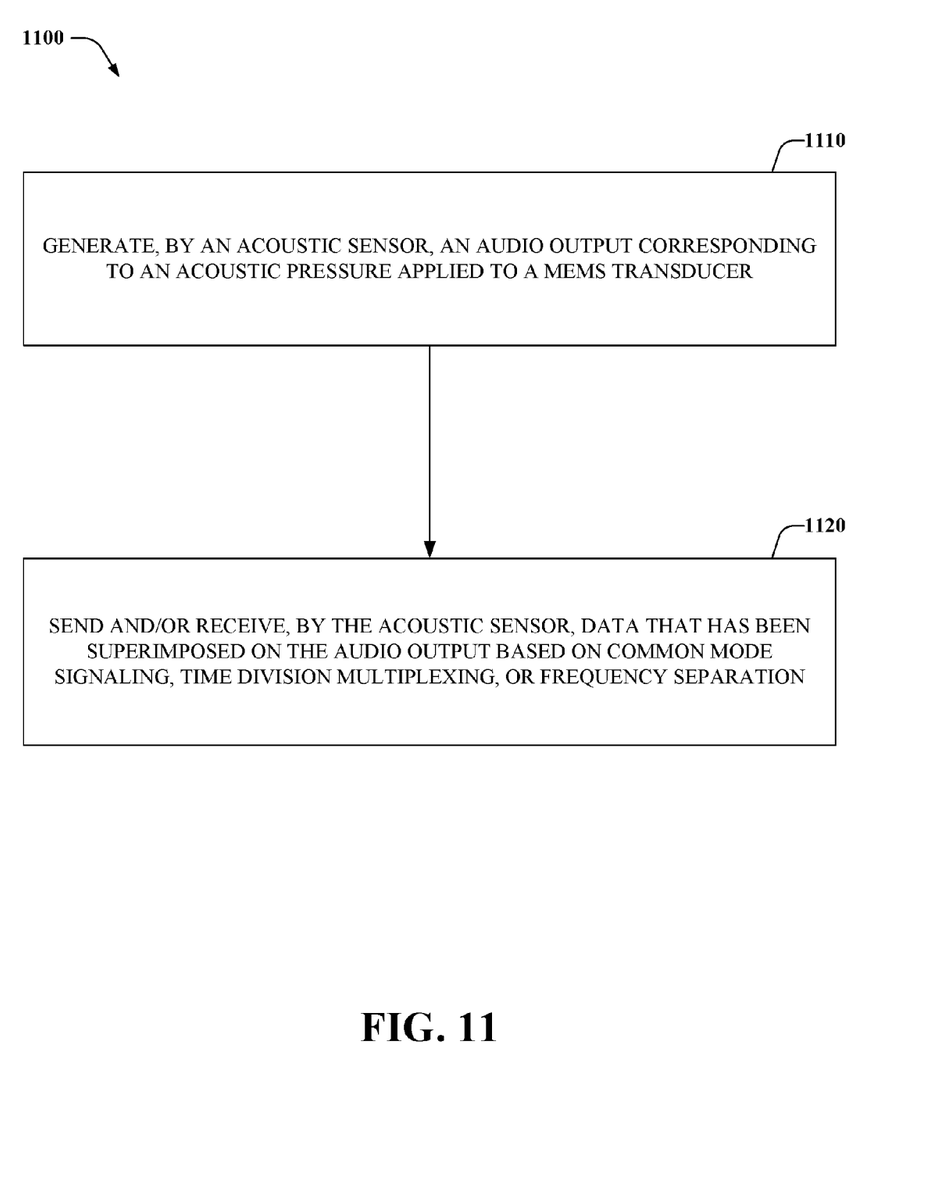
FIG. 11 illustrates a flow chart of a method associated with an acoustic sensor, in accordance with various embodiments.

FIG. 11 illustrates a methodology in accordance with the disclosed subject matter. For simplicity of explanation, the methodology is depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that one or more acts of methodologies disclosed hereinafter and throughout this specification are capable of being stored on an article of manufacture to facilitate transporting and transferring such methodologies to computers, processors, processing components, etc. The term article of manufacture, as used herein, is intended to encompass a computer program accessible from any computer-readable device, carrier, or media.

Referring now to FIG. 11, process 1100 performed by an acoustic sensor (e.g., 110) is illustrated, in accordance with various embodiments. At 1110, the acoustic sensor can generate an audio output corresponding to an acoustic pressure applied to a MEMS transducer. At 1120, the acoustic sensor can send and/or receive data that has been superimposed on the audio output based on common mode signaling, time division multiplexing, or frequency separation.

As it employed in the subject specification, the terms "processor", "processing component", etc. can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, a codec, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Further, a processor can exploit nano-scale architectures such as, but not limited to, molecular and quantum-dot based transistors, switches and gates, e.g., in order to optimize space usage or enhance performance of mobile devices. A processor can also be implemented as a combination of computing processing units, devices, etc.

In the subject specification, terms such as "memory", "non-volatile memory", and substantially any other information storage component relevant to operation and functionality of MEMS microphones and/or devices disclosed herein, refer to "memory components," or entities embodied in a "memory," or components comprising the memory. It will be appreciated that the memory can include volatile memory and/or nonvolatile memory. By way of illustration, and not limitation, volatile memory, can include random access memory (RAM), which can act as external cache memory. By way of illustration and not limitation, RAM can include synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM). In other embodiment(s) non-volatile memory can include read only memory (ROM), programmable ROM (PROM), electrically programmable ROM (EPROM), electrically erasable ROM (EEPROM), or flash memory. Additionally, the systems and/or devices disclosed herein can comprise, without being limited to comprising, these and any other suitable types of memory.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. An acoustic sensor, comprising:
   a micro-electro-mechanical system (MEMS) transducer configured to generate, based on an acoustic pressure, an audio output;
   a bi-directional communication component configured to at least one of send or receive data that has been superimposed on the audio output using common mode signaling comprising a sum of a first voltage of a first pin and a second voltage of a second pin, time division multiplexing, or frequency separation; and
   a signal processing component configured to simultaneously
   send, via the first pin and the second pin during a differential mode configuration, the audio output directed to an external device utilizing differential mode signaling between the first pin and the second pin, and
   send, via the first pin and the second pin during the differential mode configuration, the data directed to the external device utilizing the common mode signaling comprising the sum of the first voltage and the second voltage.

2. The acoustic sensor of claim 1, wherein the signal processing component is configured, based on the time division multiplexing during a time division multiplexing configuration, to send the audio output directed to the external device during a first defined period of time.

3. The acoustic sensor of claim 2, wherein the signal processing component is configured, based on the time division multiplexing during the time division multiplexing configuration, to send or receive the data during a second defined period of time different that the first defined period of time.

4. The acoustic sensor of claim 3, wherein the signal processing component is configured, during the time division multiplexing configuration, to:
   send the audio output directed to the external device utilizing the first pin of the acoustic sensor; and
   send or receive the data utilizing the first pin.

5. The acoustic sensor of claim 3, wherein the signal processing component is configured, during the time division multiplexing configuration, to:
   send the audio output directed to the external device utilizing the first pin of the acoustic sensor; and
   send or receive the data utilizing the second pin of the acoustic sensor.

6. The acoustic sensor of claim 1, wherein the signal processing component is configured, based on the frequency separation during a frequency separation configuration, to send or receive the data based on a defined frequency range that is outside an audio band corresponding to the audio output or substantially outside the audio band.

7. The acoustic sensor of claim 6, wherein the defined frequency range corresponds to a notch of a decimation filter of another external device coupled to the acoustic sensor.

8. The acoustic sensor of claim 6, wherein the signal processing component is configured, during the frequency separation configuration, to:
   send the audio output directed to the external device utilizing the first pin of the acoustic sensor; and
   send or receive the data utilizing the first pin.

9. The acoustic sensor of claim 6, wherein the signal processing component is configured, during the frequency separation configuration, to:
   send the audio output directed to the external device utilizing the first pin of the acoustic sensor; and
   send or receive the data utilizing the second pin.

10. The acoustic sensor of claim 1, further comprising a power line communication component configured to at least one of send or receive communication data utilizing at least one of a power pin of the acoustic sensor or a ground pin of the acoustic sensor.

11. A method, comprising:
    generating, by an acoustic sensor, an audio output corresponding to an acoustic pressure applied to a micro-electro-mechanical (MEMS) transducer;
    at least one of sending or receiving, by the acoustic sensor, data that has been superimposed on the audio output based on common mode signaling comprising a sum of respective voltages of a first pin and a second pin, time division multiplexing, or frequency separation; and sending, during a differential signaling configuration using the first pin and the second pin, the audio output directed to an external device using differential signaling between the first pin and the second pin, wherein the sending or the receiving the data based on the common mode signaling comprises simultaneously sending the data directed to the external device during the differential signaling configuration using the first pin and the second pin, and wherein the data comprises the sum of the respective voltages of the first pin and the second pin.

12. The method of claim 11, wherein the sending or the receiving the data based on the time division multiplexing comprises:
sending, during a time division multiplexing configuration, the audio output directed to the external device during a first time period; and
during the time division multiplexing configuration, sending or receiving the data during a second time period different than the first time period.

13. The method of claim 12, wherein the sending the audio output directed to the external device during the first time period comprises sending the audio output using the first pin, and wherein the sending or the receiving the data during the second time period comprises sending or receiving the data during the second time period using the first pin.

14. The method of claim 11, wherein the sending or the receiving the data based on the frequency separation comprises sending or receiving the data based on a defined frequency range that is outside an audio band corresponding to the audio output or substantially outside the audio band.

15. The method of claim 14, wherein the sending or the receiving the data based on the defined frequency range comprises sending or receiving the data based on a defined stopband of a band-stop filter of another external device coupled to the acoustic sensor.

16. The method of claim 14, wherein the sending or the receiving the data based on the defined frequency range comprises:
sending the audio output directed to the external device using the first pin; and
sending or receiving the data using the first pin.

17. The method of claim 11, further comprising:
at least one of sending or receiving, by the acoustic sensor, communication data using at least one of a power pin of the acoustic sensor or a ground pin of the acoustic sensor.

18. A system, comprising:
an acoustic transducer configured to convert an acoustic signal into an audio output;
a bi-directional communication component configured to at least one of send or receive data that has been superimposed on the audio output based on a common mode transmission comprising a sum of a first voltage of the first pin and a second voltage of the second pin, time division multiplexing transmission, or frequency separation; and
a signal processing component configured to send, during a differential mode configuration, the audio output directed to an external device using differential signaling between the first pin and the second pin, and simultaneously send, during the differential mode configuration, the data directed to the external device via the common mode transmission comprising the sum of the first voltage and the second voltage.

19. The system of claim 18, wherein the signal processing component is configured to:
based on at least one of the time division multiplexing transmission of the frequency separation:
send or receive the data using the first pin; and
send the audio output directed to the external device using the first pin.

20. The system of claim 19, wherein the signal processing component is configured, during the time division multiplexing transmission, to:
send the audio output directed to the external device during a first time period; and
send the data directed to the external device during a second time period different than the first time period.

* * * * *